May 19, 1936.  C. E. FAY  2,041,122
TRANSMISSION CONTROL SYSTEM
Filed Dec. 23, 1931  2 Sheets-Sheet 1
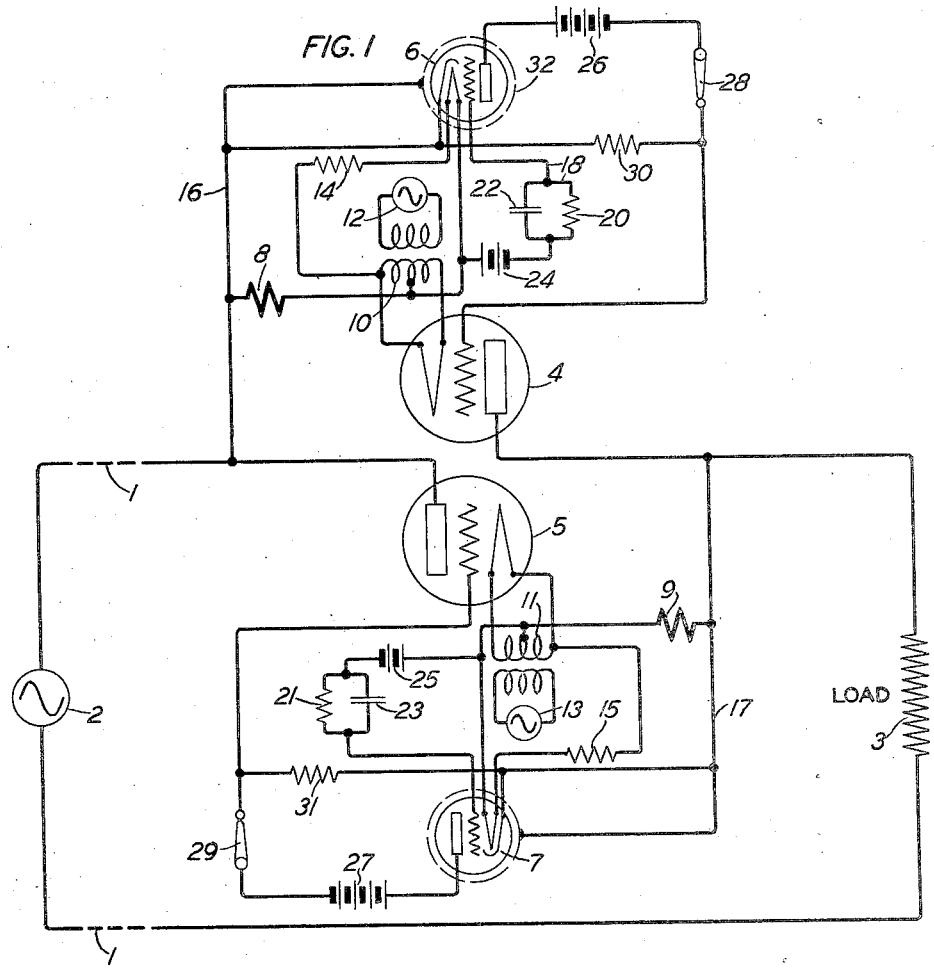
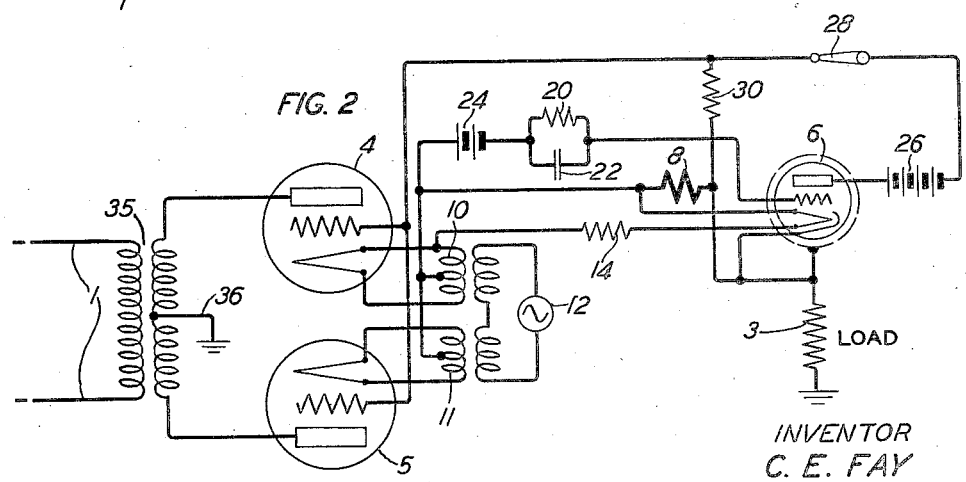
INVENTOR
C. E. FAY
BY H. A. Burgess
ATTORNEY INVENTOR
C. E. FAY
BY H. A. Burgess
ATTORNEY Patented May 19, 1936

2,041,122

UNITED STATES PATENT OFFICE 2,041,122

TRANSMISSION CONTROL SYSTEM

Clifford E. Fay, Orange, N. J., assignor to Bell Telephone Laboratories, Incorporated, New York, N. Y., a corporation of New York Application December 23, 1931, Serial No. 582,763

5 Claims. (Cl. 175—363)

The present invention relates to circuit control by means of electric space discharge devices and particularly to the use of such devices to protect a circuit against the effects of excessive voltages.

In accordance with the present invention in its preferred form, overload protection is secured by the combination of a main tube and a pilot or auxiliary tube. The pilot or auxiliary tube is sensitive to an overload current condition on the line and causes the main tube to interrupt the line circuit when such overload condition occurs.

The pilot or auxiliary tube is of the hot-cathode, gas-filled type and includes a grid or control element for controlling the breakdown of the tube. The main discharge tube is also preferably a hot-cathode, gas-filled tube. It is provided with a grid or control element for blocking transmission through the tube under the overload condition. The pilot or auxiliary tube is arranged to control the grid potential of the main discharge tube.

It is an object of the invention to interrupt the line circuit substantially immediately after an excess current condition occurs on the line and to maintain the line circuit open as long as may be desired thereafter.

A protective system in accordance with the invention would, in the case of an alternating current system, comprise a main gas-filled tube in series in the line circuit and an auxiliary or pilot tube connected so that its grid derives a voltage from the line circuit. Normally the main discharge tube transmits current on each positive half wave of the applied voltage and normally the pilot tube is without current. When an excess current condition arises the pilot tube breaks down and throws the grid or control element of the main gas-filled tube to a high negative voltage condition. This action occurs near the peak of the applied voltage. As the voltage in that half cycle reduces to zero, the current transmitted through the main tube falls to zero and on account of the large negative grid voltage this current will not restart on the next succeeding positive half wave of line voltage. The line circuit is therefore effectively interrupted at the end of the same cycle in which the excess current condition occurs.

The above described elemental form of circuit is, of course, capable of many modifications some of which are disclosed in the accompanying drawings. A better understanding of the nature and objects of the invention will be had from the following description of these various circuits as illustrated in the drawings.

In the drawings, Fig. 1 is a schematic drawing of an alternating current transmission system incorporating an overload protection device according to the invention;

Fig. 2 shows a rectifying system utilizing the invention;

Figure 3:
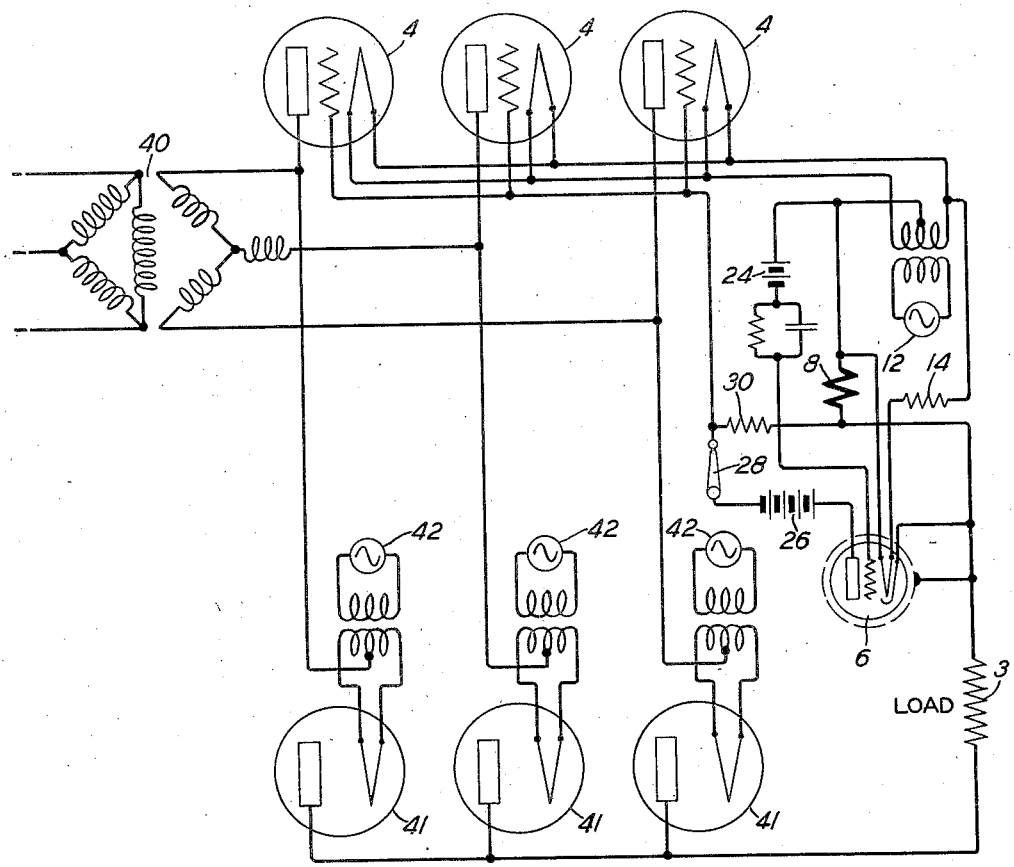
Fig. 3 shows a three-phase rectifier system according to the invention.

In Fig. 1, the power transmission line 1, 1 extends from the alternator 2 to the load 3, and includes in series in the line the space paths of the two discharge tubes 4, 5 connected reversely so as to transmit both half waves of current.

Associated with these main tubes 4 and 5 are pilot or auxiliary tubes 6 and 7 respectively. The circuit elements associated with tubes 4 and 6 may be identical with those associated with tubes 5 and 7, so that it will suffice to describe in detail only the former.

The series circuit through tube 4 is from line 1 (at the left) through main resistance 8, to center of cathode heating secondary 10, cathode of tube 4, anode of tube 4, and thence to load 3, upper terminal. Heating current for the cathode of tube 4 is supplied from an alternating current source 12 which may be a separate source or may comprise a suitable coupling to the line 1 to derive its power from the line.

The tube 4 is of the hot-cathode gas-filled type, such as is known to the electrical art as a "Thyratron" tube and operates principally by gas ionization. For this purpose it is filled to an appropriate pressure with some inert gas such as argon or any other suitable gas or vapor, for example, mercury vapor.

Tube 6 is similar to tube 4 in that it is a hot-cathode gas-filled tube, but it can be a much smaller tube since it need handle only a relatively small amount of power. It is shown as provided with an indirectly heated cathode, the filament or heating element of which is connected, through resistance 14, across a portion of the secondary 10 to derive suitable voltage therefrom.

The cathode of tube 6 is connected to the left-hand terminal of resistance 8, by lead 16, while the grid is connected to the right-hand terminal of this resistance by lead 18, which includes resistance 20 and condenser 22 in parallel, and biasing battery 24.

The anode circuit of tube 6 is traced from anode through battery 26, normally closed switch 28, and resistance 30 to cathode.

The grid circuit of tube 4 extends from cathode, through resistance 8, lead 16, resistance 30 to grid.

Tube 6 is preferably enclosed within an electrostatic shield 32 having a metallic connection to lead 16 and the cathode.

The operation of the part of the circuit thus far described is as follows: Half waves of current of one sign from alternator 2 are transmitted through tube 4, and the opposite half waves pass through tube 5. When tube 4 is transmitting current, the right-hand end of resistance 8 is positive with respect to the left terminal due to the voltage drop through this resistance. Thus a positive potential is applied to the grid of tube 6 over the grid circuit above traced. Biasing battery 24 is so adjusted that for normal line current the tube 6 is not rendered conductive by application of this voltage drop to its grid, the grid voltage being kept sufficiently negative by battery 24. Excess current on line 1, however, makes the grid of tube 6 sufficiently positive to cause the tube to break down and send a rush of current from battery 26 through resistance 30. The drop of potential developed across resistance 30 is applied in series with resistance 8 to the grid-cathode circuit of tube 4, giving the grid a very high negative potential.

At the end of the half cycle in which the overvoltage condition has occurred, the anode voltage of tube 4 reduces to zero and then reverses sign under control of alternator 2, and the current in tube 4 reduces to zero.

Neglecting for the moment the action of tube 5, it will be seen that current will not restart through tube 4 on the next succeeding positive half wave of voltage because its grid is charged to an excessively high negative potential due to current flow through resistance 30. It will be understood that this voltage remains applied to the grid of tube 4 so long as switch 28 remains closed, since current continues to flow through a gas-filled tube when once started, without the necessity of keeping the grid potential at any particular value.

The parallel resistance and condenser combination 20—22 enables a large voltage to be applied instantly to the grid of the tube, but at the same time provides for limiting the grid current flow after the grid has gone positive. In a typical example of a circuit used by applicant, the condenser 22 had a capacity of 0.1 microfarad and resistance 20 had a resistance of 4000 ohms.

It will be clear from the above description that tubes 5 and 7 cooperate in the same manner as tubes 4 and 6, normally to transmit the alternate half waves of current and in case of an excess current to prevent tube 5 from restarting on the next succeeding half cycle of voltage of appropriate sign. (For convenience of reference, the corresponding circuit elements in the case of tubes 5 and 7 have been indicated by odd numbers one higher than the even numbers applied to the elements associated with tubes 4 and 6. Thus resistances 9 and 31 are identical with resistances 8 and 30, etc.)

Figure 4:
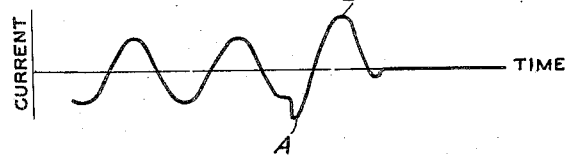
Figs. 4 and 5 show wave shapes obtained with certain of the circuits.

Fig. 4 shows the character of an oscillograph record made with a circuit like that just described, in which an excess voltage was intentionally produced at the point A. To the left of A, representing earlier times, the voltage amplitude was normal. At A, a relay was operated to (in effect) cut out series resistance thus increasing the line current to a value above normal. At this instant, tube 6 operated to throw the grid potential of tube 4 to a high negative value. The next half cycle, B, similarly caused tube 7 to discharge and place a high negative voltage on the grid of tube 5. As a result neither tube transmitted any current in the next succeeding half cycle nor thereafter.

It will be clear from the operation that has been described above that the tubes 4 and 5 must each have a cathode capable of supplying peak rated line current continuously and peak overload current for one half cycle. Also these tubes must be capable of blocking peak line voltage plus an allowance for abnormal conditions. For example, these tubes must block the line current when a sufficiently large negative grid voltage is applied even if the plate is driven to its maximum positive voltage. These tubes must also be built to withstand the voltage condition in which the plate is negative with respect to the cathode.

In order that the anode voltage of the tube 6, that is, the voltage of battery 26 be kept as small as practicable, it is desirable that the tube 4 and likewise tube 5 have a high amplification constant. This voltage is determined by the line voltage and the amplification constant of the tube 4. If this voltage is represented by E and if the line voltage against which it is necessary to protect the load is $E_L$ including allowance for abnormal conditions $$E = \frac{E_L}{\mu} + E_B$$

where $E_B$ is the voltage drop across the tube 6 when current is flowing in its plate circuit.

The resistance 30 should be sufficient to limit the plate current of tube 6 to within its allowable limits. The tube 6 must be capable of blocking its plate current with the full normal voltage of battery 26 on its plate and with its grid at sufficient negative potential with respect to its cathode.

The negative grid voltage of tube 6 from battery 24 and the resistance 8 will be determined as follows: If $I_L$ is the peak line current at which it is desired to cut off, then $$E_{24} - I_L R_8 = \frac{E_4}{\mu_6}$$

In general it will be desirable to keep the voltage of battery 24 and resistance 8 as small as possible which would indicate that $\mu_6$ should be large. However, it should be remembered that contact potential in tube 6 may vary considerably so that the voltage of battery 24 should be large enough to minimize the effect of such variations.

It will be understood that if the circuit requires that the cathode of tube 6 operate at a potential above ground, the cathode heating transformer must have sufficient insulation between its secondary winding and ground to withstand this voltage.

In an actual laboratory set-up of the circuit according to Fig. 1, the following apparatus and circuit constants were used. Tubes 4 and 5 were of the 61—GY type Western Electric tubes and the tubes 6 and 7 were of Western Electric 256—A type. The voltage of batteries 26 and 27 was 90 volts. Batteries 24 and 25 were each of 7½ volts. Resistances 8 and 9 were each 1 ohm and resistances 30 and 31 were of 5000 ohms each. This circuit was successfully used in a 220 volt, 60 cycle, alternating current line with two 115 volt, 500 watt lamps and a 20 ohm rheostat in series as the load. The overload was produced by shunting two 100 watt lamps in series across the 500 watt lamp. The normal current in the circuit was 3.4 amperes R. M. S. and the apparatus was set to trip at 4.2 amperes R. M. S. The transients produced by adding the cold 100 watt lamp exceeded this value and the circuit was automatically opened as has already been described in connection with Fig. 4.

It will be understood that the circuit is reset by opening switch 28.

In the full wave rectifier circuit of Fig. 2, the tubes 4 and 5 have their cathodes connected together and their grids connected together so that only one auxiliary tube 6 is necessary. The alternating current line 1 is shown connected to the anodes of the two tubes 4 and 5 through power transformer 35 which has a ground connection 36 at its midpoint. A load 3 at the right of the figure is also connected to ground.

Figure 5:
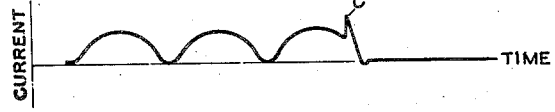

The rest of the construction of the circuit of Fig. 2 will be clear from a comparison of Fig. 1, similar reference characters having been used for both figures. The resistance 8 of Fig. 2 lies in the common output path of both tubes 4 and 5 in series with the load resistance 3. When the current in either half cycle exceeds the permissible maximum, the voltage drop across the terminals of resistance 8 corresponding to the excess current flow is applied to the grid of the tube 6 causing it to go sufficiently far negative to prevent transmission to the opposite tube on the next half cycle. This action is illustrated in Fig. 5 where two normal rectified current impulses are shown followed by a third half cycle in which an overload occurs at the point C, near the last quarter of the half cycle. Due to this overload the grids of the rectifier tubes were sent negative immediately and the voltage was removed from the load at the end of that half cycle so that in this case the voltage was cut off about ⅛ of a cycle after the overload appeared. In general, with this type of circuit, the voltage will be cut off at the end of the half cycle in which the overload appears. The overload in this case was produced in a manner similar to that described in connection with Fig. 4, that is, by the shunting of a 100 watt lamp across the 500 watt lamp in the load. The load in this case was one half of that in the case of Fig. 1 since only 110 volts each side of the center point of the power transformer were used.

Fig. 3 shows the application of the invention to a three-phase full wave rectifier. In this circuit only three tubes need be of the three-electrode type, the other three may be ordinary rectifiers. In this circuit the voltage would be cut off automatically in less than half a cycle after the overload appeared.

Referring to the drawings, the power transformer is shown at 40. The tubes 4 at the top of the figure correspond to tube 4 of Fig. 1. The two-electrode tubes 41, 41 are gas-filled tubes of the same type as Fig. 4 except they have no grid or third electrode. It will be understood that tubes of the same type as 4 might be used at 41 is desired.

It is believed that the operation of the circuit of Fig. 3 will be entirely clear from that described in connection with Fig. 2. The single auxiliary tube 6 upon breakdown applies a high negative voltage to all three grids of tubes 4, preventing the application of excess current to the load 3 upon the next successive half phase of voltage.

What is claimed is:

1. The combination with an alternating current transmission line of a main and an auxiliary gas-filled discharge tube, each having a grid or control element, said main tube having its space path in series in said circuit and transmitting the line current on positive half waves of voltage, means making the anode of said auxiliary tube positive with respect to its cathode, said auxiliary tube having its grid and cathode connected to derive a potential difference from said line sufficient to permit current flow through the tube only in case of an excess current condition on said line, and means controlled by space current flow through said auxiliary tube for placing a negative voltage on the grid of said main tube with respect to its cathode sufficient to prevent current flow through said main tube.

2. The combination with a line circuit of a main space discharge device in series in said line circuit, said device having a cathode active to emit electrons whether space current continues to flow or not, an auxiliary space discharge device, said auxiliary device having a plurality of electrodes including an electron-emitting cathode and an anode, a source of anode voltage, said auxiliary device being filled with inert gas, means to impress a voltage from the line circuit across two of the electrodes of said auxiliary device to control said device, said auxiliary device initially transmitting current only in response to line current in excess of a prescribed value, but when once broken down continuing to transmit current independent of the continuance of excess line current and means operating in response to the initial and the continued current flow through said auxiliary device for making the impedance of said main device equivalent to open circuit impedance.

3. A rectifying circuit comprising a main gas-filled rectifier tube, a source of alternating current to be rectified applied to said tube, a load circuit, an auxiliary gas-filled tube having an input circuit and an output circuit, its input circuit being associated with said load circuit to derive a voltage therefrom sufficient only in case of excess rectifier current to cause the break down of said auxiliary tube, means controlled by the current flow in the output circuit of said auxiliary tube for disabling said rectifier and means including a source of voltage in the output circuit to maintain current flow in the output circuit of said auxiliary tube after said rectifier has been disabled.

4. A multi-phase rectifying circuit as defined in claim 3, including a main rectifying tube for each phase and one auxiliary tube for a plurality of said rectifying tubes.

5. A multi-phase rectifying system including a full wave rectifier for each phase, each full wave rectifier comprising a first gas-filled tube having a control electrode and a second gas-filled tube, a source of multi-phase voltage to be rectified, a load circuit common to said rectifiers, an auxiliary gas-filled tube having an input circuit and an output circuit, its input circuit being associated with said load circuit to derive a voltage therefrom, sufficient only in case of excess rectifier current to cause the breakdown of said auxiliary tube, means controlled by current flow in the output circuit of said auxiliary tube for placing a negative bias on the control electrodes of said first gas-filled tube of each of said full wave rectifiers, thereby disabling such first tubes, and means including a source of voltage in the output circuit to maintain current flow in the output circuit of said auxiliary tube after said rectifiers have been disabled.

CLIFFORD E. FAY.